United States Patent
Uchida et al.

(10) Patent No.: US 8,352,477 B2
(45) Date of Patent: Jan. 8, 2013

(54) USER SPECIFIC FOCUS PARAMETERS

(75) Inventors: Yuki Uchida, West Caldwell, NJ (US);
Shun Tanaka, West Caldwell, NJ (US);
Kazuhiko Kato, West Caldwell, NJ (US)

(73) Assignee: Ricoh Company, Ltd., Tokyo (JP)

( * ) Notice: Subject to any disclaimer, the term of this patent is extended or adjusted under 35 U.S.C. 154(b) by 329 days.

(21) Appl. No.: 12/722,376

(22) Filed: Mar. 11, 2010

(65) Prior Publication Data
US 2011/0225505 A1 Sep. 15, 2011

(51) Int. Cl.
*G06F 7/00* (2006.01)
*G06F 17/30* (2006.01)
(52) U.S. Cl. .......................... 707/754; 707/765
(58) Field of Classification Search ............... 707/754, 707/765, 999.003
See application file for complete search history.

(56) References Cited

U.S. PATENT DOCUMENTS

| | | | |
|---|---|---|---|
| 7,117,247 B2 | 10/2006 | Hyakutake et al. | |
| 7,142,690 B2 | 11/2006 | Hyakutake et al. | |
| 7,149,784 B2 | 12/2006 | Kitada et al. | |
| 7,194,433 B1 | 3/2007 | Hyakutake et al. | |
| 7,227,655 B1 | 6/2007 | Uchida et al. | |
| 7,321,867 B1 | 1/2008 | Uchida et al. | |
| 7,415,441 B1 | 8/2008 | Uchida | |
| 7,599,864 B2 | 10/2009 | Uchida et al. | |
| 7,624,045 B2 | 11/2009 | Uchida et al. | |
| 2008/0291471 A1 | 11/2008 | Uchida | |
| 2009/0276413 A1 | 11/2009 | Uchida | |
| 2010/0095354 A1 | 4/2010 | Uchida et al. | |
| 2010/0146593 A1* | 6/2010 | Stahl et al. | 726/4 |
| 2011/0025715 A1 | 2/2011 | Uchida et al. | |
| 2011/0173270 A1 | 7/2011 | Uchida et al. | |

OTHER PUBLICATIONS

U.S. Appl. No. 12/722,367, filed Mar. 11, 2010.
U.S. Appl. No. 12/722,370, filed Mar. 11, 2010.
U.S. Appl. No. 12/722,374, filed Mar. 11, 2010.
U.S. Appl. No. 12/722,381, filed Mar. 11, 2010.
U.S. Appl. No. 12/722,367, filed Mar. 11, 2010 of Yuki Uchida et al.
U.S. Appl. No. 12/722,370, filed Mar. 11, 2010 of Yuki Uchida et al.
U.S. Appl. No. 12/722,374, filed Mar. 11, 2010 of Yuki Uchida et al.
U.S. Appl. No. 12/722,381, filed Mar. 11, 2010 of Yuki Uchida et al.
U.S. Appl. No. 12/958,686, filed Dec. 2, 2010 of Shun Tanaka.
U.S. Appl. No. 13/014,384, filed Jan. 26, 2011 of Shun Tanaka.
U.S. Appl. No. 13/036,455, filed Feb. 28, 2011 of Shun Tanaka.
U.S. Appl. No. 13/036,558, filed Feb. 28, 2011 of Shun Tanaka.
U.S. Appl. No. 13/036,644, filed Feb. 28, 2011 of Shun Tanaka.
U.S. Appl. No. 13/036,745, filed Feb. 28, 2011 of Shun Tanaka et al.
U.S. Appl. No. 13/086,608, filed Apr. 14, 2011 of Shun Tanaka et al.
U.S. Appl. No. 13/086,779, filed Apr. 14, 2011 of Shun Tanaka et al.

* cited by examiner

*Primary Examiner* — Alexey Shmatov
(74) *Attorney, Agent, or Firm* — Cooper & Dunham LLP

(57) ABSTRACT

Apparatuses, systems and methods are provided for accessing a document management application through a network, wherein one or more key terms and focus terms (selected from user-specific focus parameters) for selected search parameters are transmitted to the document management application for limiting a search to be performed by a search function of the document management application.

19 Claims, 24 Drawing Sheets

Fig. 3A

| FOCUS PARAMETER INFORMATION ||
|---|---|
| Application Function | Candidate Focus Parameters |
| Document registration function | Directory, Author, Format, Account #, Case #, Client #, Docket #, Invoice # Patient #, Vendor # |
| Search Function | Directory, Author, Size, Format, Creation date, Modification date, Account#, Case #, Client #, Docket #, Invoice # Patient #, Vendor # |
| ... | ... |
| ... | ... |
| ... | ... |

Fig. 3B

| FOCUS PARAMETER INFORMATION ||
|---|---|
| Application Function | Candidate Focus Parameters (-Relevancy) |
| Search Function | Directory - All<br>Author - All<br>Size - All<br>Format - All<br>Creation date - All<br>Modification date - All<br>Account # - Accounting<br>Case # - Legal<br>Client # - Legal<br>Docket # - Legal<br>Invoice # - Accounting<br>Patient # - Medical<br>Vendor # - Accounting |

Fig. 4A

| USER ACCESS INFORMATION | | | |
|---|---|---|---|
| Username | Business Relevancy Information | Data Access Information | Document Parameters Information |
| John.Smith | Legal | A,B,C | Directory, Author, Size, Format |
| Jane.Doe | Medical | A,B,C,D | Directory, Size, Format |
| James.Sample | Finance | E,H,I | Author, Format |
| Julie.Bravo | Finance | S,T,U,V,W,X | Directory, Author |
| Jim.Alpha | Accounting | A,T,X | Author, Size, Format |
| Jeffrey.Oscar | Legal | B,D,F,G | Directory, Author, Format |
| ... | ... | ... | ... |
| ... | ... | ... | ... |
| ... | ... | ... | ... |

Fig. 4B

| ACCESS CONTROL INFORMATION ||
|---|---|
| Username | Access Control List |
| John.Smith | A,B,C |
| Jane.Doe | A,B,C,D |
| James.Sample | E,H,I |
| Julie.Bravo | S,T,U,V,W,X |
| Jim.Alpha | A,T,X |
| Jeffrey.Oscar | B,D,F,G |
| ... | ... |
| ... | ... |
| ... | ... |

LOGIN USER INTERFACE

| Full Name: | John A. Smith |
| Username: | John.Smith |
| Password: | 123!@# |

Complete

Fig. 5A

FUNCTION SELECTION USER INTERFACE

Please Select Application Function:

- ◎ Document Registration Function
- ● Search Function
- ◎ Download Function

[ Complete ]

Fig. 5B

SEARCH INTERFACE
Search Function

Key Terms:

| | |
|---|---|
| *All of the words* | boy  motorcycle  cat  snow |
| *Exact phrase* | |
| *Any of the words* | |
| *None of the words* | |

Focus Parameters:

| | | |
|---|---|---|
| Directory | *is* | G://XYZ/Legal1 |
| Author | *is* | Jim.Alpha |
| Size | *smaller than* | 100 KB |
| Format | *is* | Microsoft Word |

| Search | Save |
|---|---|

Fig. 5C

SEARCH INTERFACE
Search Function

Key Terms:

| | |
|---|---|
| *All of the words* | boy  motorcycle  cat   snow |
| *Exact phrase* | |
| *Any of the words* | |
| *None of the words* | |

Parameters:

| | | | | | |
|---|---|---|---|---|---|
| ∨ | Directory | ∨ | *is* | ∨ | --- |
| ∨ | Author | ∨ | *is* | ∨ | G://XYZ/Legal1<br>G://XYZ/Legal2<br>G://XYZ/Legal3 |
| ∨ | Size | ∨ | *smaller than* | ∨ | |
| ∨ | --- | ∨ | --- | ∨ | --- |

Search    Save

Fig. 6A

SEARCH INTERFACE
Search Function

Key Terms:

| | |
|---|---|
| *All of the words* | boy  motorcycle  cat   snow |
| *Exact phrase* | |
| *Any of the words* | |
| *None of the words* | |

Parameters:

| | | |
|---|---|---|
| Directory | *is* | G://XYZ/Legal1 |
| Author | *is* | Jim.Alpha |
| Size | *smaller than* | 100 KB |
| --- | *is* | --- |

Client #
Docket #
Case #

[ Search ]  [ Save ]

Fig. 6B

SEARCH INTERFACE
Search Function

Key Terms:

*All of the words* | boy  motorcycle  cat  snow

*Exact phrase* |

*Any of the words* |

*None of the words* |

Parameters:

| Directory | *is* | --- |
| Author | *is* | G://XYZ/Accnt1 |
|  |  | G://XYZ/Accnt2 |
|  |  | G://XYZ/Accnt3 |
| Size | *smaller than* | --- |
| --- | --- | --- |

Search    Save

Fig. 7A

SEARCH INTERFACE
Search Function

Key Terms:

- *All of the words*: boy motorcycle cat snow
- *Exact phrase*:
- *Any of the words*:
- *None of the words*:

Parameters:

| Directory | is | G://XYZ/Accnt1 |
|---|---|---|
| Author | is | Jim.Alpha |
| Size | smaller than | 100 KB |
| --- | is | --- |

Account #
Invoice #
Vendor #

Search | Save

Fig. 7B

USER SPECIFIC FOCUS PARAMETERS

TECHNICAL FIELD

This disclosure relates to systems, apparatuses and methodologies for obtaining document management services from a document management application that include a plurality of application functions, through a network. More specifically, a request for an application function is transmitted with focus terms to the document management application.

BACKGROUND

In the current information age, information technology (IT) tools for managing files and data are extensively used in enterprises and other organizations, in order to store and transfer electronic documents and data over a network.

A document management system (for example, DocumentMall) can provide users with remote access (that is, through a network) to software applications and related services that would otherwise have to be installed on the user's local computer. For example, such a document management system may be configured to store documents as electronic files in a network-connected (and secure) document storage device, in order to protect the documents from theft or loss and to avoid unnecessarily occupying storage space local to the user computer or local computing environment, while making such files available on demand. The documents may include voluminous and/or sensitive material, and may be configured to provide searchable databases of all forms of legal, medical, financial, educational, scientific, and marketing documents for individuals and/or companies via a network.

A conventional document management system typically includes a plurality of application functions, such as a document registration function to register a specified document in a document database of the document management system, and a search function to search document data in a document storage part of the document management system based on the specified search terms. FIG. 1A depicts an example of such a document management system 100, where client terminals 12-1 through 12-4 may upload and download documents to/from a document storage part of the document management system 15, via the network 11.

There is a drawback, however, in that user interfaces for utilizing such application functions of a conventional document management system are often static and inflexible, with the same set of rigid options presented to all users. For instance, a user of a search user interface is often forced to browse through all of the possible search options that the universe of users may wish to access. This is despite the fact that certain user or groups of users may be interested in consistently utilizing a specific set of services of a search function or other application function of the document management system.

Furthermore, there is another drawback in that a search result list of a search function of conventional document management system may not be returned to a user after the search results list is completely compiled, but instead the search result list may be continuously updated with further documents in a 'streaming' manner as these further documents are discovered. Thus, a user viewing a search results list at a given time may be mistaken as to the completeness of the search results list, since the list may continue to be updated with further documents as they are retrieved by the search function of the conventional document management system. Therefore, great inconvenience is caused to the user.

There exists a need for an improved document management system which is not as difficult and time-consuming to use.

SUMMARY

This disclosure provides user interface tools (in the form of systems, apparatuses, methodologies, computer program products, etc.) for obtaining document management services from a document management application, including a plurality of application functions, through a network.

In an aspect of this disclosure, a document access apparatus (or application user interface apparatus) provides an operations user interface to an application user, to show user-specific focus parameters, determined according to user access information of the application user, for a selected application function (of the document management application), and for the application user to select one or more of the user-specific focus parameters of the selected application function and specify parameters values for the selected focus parameters of the selected application function.

In another aspect, an application interface part of the application user interface apparatus obtains and registers focus parameter information indicating candidate focus parameters for application functions of a document management application, from an application program interface of the document management application, upon the login by an application user in a specific session.

In another aspect, the operations user interface of the document access apparatus (or application user interface apparatus) includes a search interface configured for an application user to specify one or more key terms and focus terms for selected search parameters for limiting a search to be performed by a search function of the document management application.

In another aspect, the key terms and focus terms are communicated by the application interface part of the document access apparatus (or application user interface apparatus) through the network to the document management application for a search, and no further communications between the application interface part and the operations user interface part is conducted, until a set of search results has been received and compiled. The search results are communicated to the operations user interface part only after the search results have been received and compiled.

In another aspect, registered focus parameter information is utilised to determine user-specific focus parameters of a particular application function, upon selection of the particular application function by the application user in the specific session.

In another aspect, user-specific focus parameters of the selected application function are determined based on user access information of an application user, after the application interface part obtains focus parameter information indicating the candidate focus parameters for a selected application function of a document management application, from the application program interface of the document management application.

In another aspect, user access information is communicated to an application program interface of a document management application, upon login by the application user, and the application program interface of the document management application determines and returns user-specific focus parameters of a particular application function, based on the user access information of the application user.

BRIEF DESCRIPTION OF THE DRAWINGS

The above-mentioned and other features, aspects and advantages can be more readily understood from the following detailed description with reference to the accompanying drawings wherein:

FIGS. 3A and 3B show an example of focus parameter information;

FIG. 4A shows an example of user access information, while FIG. 4B shows an example of access control information;

FIG. 5A shows an example of a screen of a login user interface;

FIG. 5B shows an example of a screen of a function selection user interface;

FIG. 5C shows an example of a screen of a search interface;

FIGS. 6A and 6B show examples screens of a search interface;

FIGS. 7A and 7B show examples of screens of a search interface;

DETAILED DESCRIPTION

Figure 1:
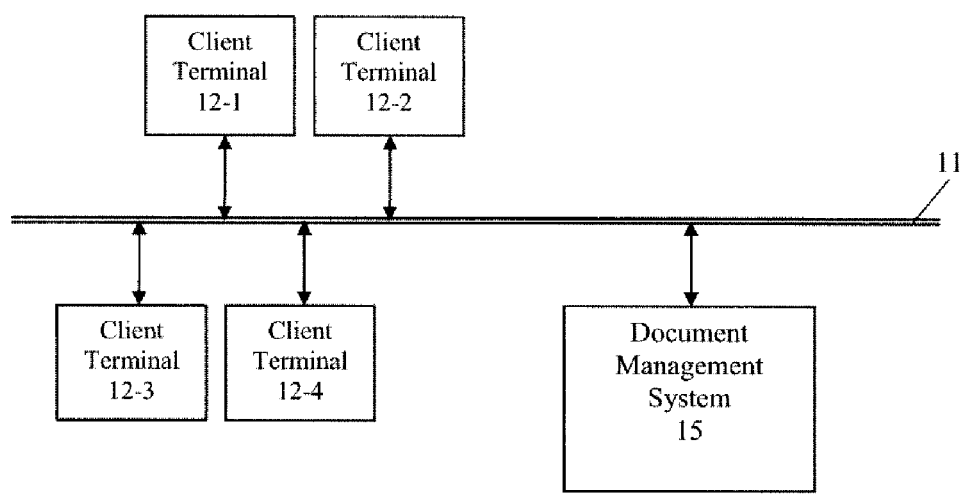
FIG. 1 shows a block diagram of a conventional system.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Figure 2:
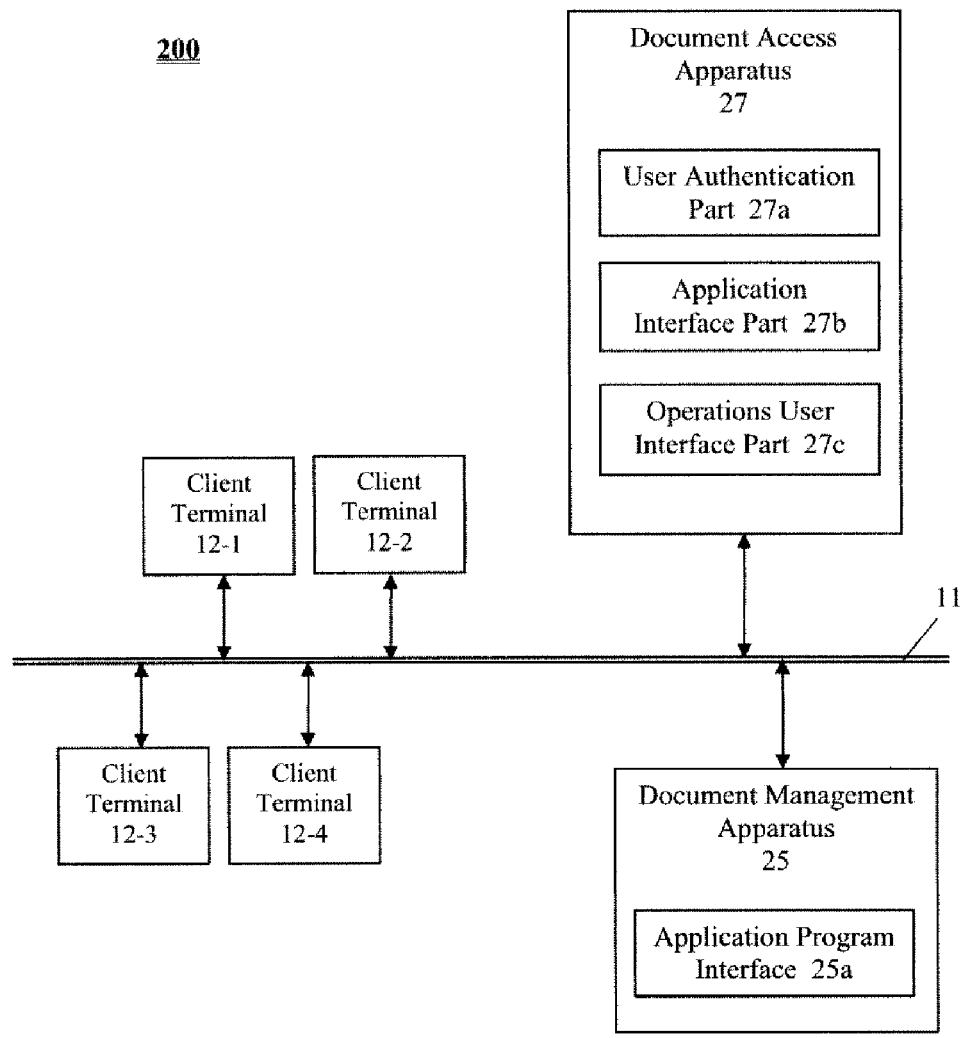
FIG. 2 shows a block diagram, of a system, according to an exemplary embodiment of this disclosure.

Referring now to the drawings, wherein like reference numerals designate identical or corresponding parts throughout the several views, FIG. 2 shows schematically a system 200 for streamlining access in a document management system, according to an exemplary embodiment of this disclosure.

System 200 includes a plurality of client terminals 12-1 through 12-4, a document management apparatus 25, and a document access apparatus (or also referenced herein as "application user interface apparatus") 27, all of which are interconnected by a network 11.

The plurality of client terminals 12-1 through 12-4 may be substantially similar to those depicted in FIG. 1. In particular, the client terminals 12-1 through 12-4 are configured with software allowing the client terminals to communicate through the network 11 with at least the document access apparatus 27 and preferably also the document management apparatus 25. In particular, the client terminals 12-1 through 12-4 may transmit data to, and receive data from, the document access apparatus 27.

The document management apparatus 25 may be configured to execute a document management application having a plurality of application functions. One of the plurality of application functions may be a document registration function to register a specified document in a document database (in a storage part of the document management apparatus 25, for example). Another one of the plurality of application functions may be a search function to search a document database of the document management apparatus 25 based on specified terms, such as key terms and focus parameters, as will be described below. Another one of the plurality of application functions may be a download function to download specified document data from a document database of the document management apparatus 25. It should be understood that this list of application functions is not limiting, and that other application functions may be featured by a document management system.

The document management apparatus 25 includes an application program interface 25a. The application program interface 25a is configured to specific focus parameter information indicating candidate focus parameters for the application functions of the document management apparatus 25. That is, the application program interface 25a is configured to specify, for each specific one of the plurality of application functions, candidate focus parameters for the specific application function.

An example of focus parameter information is depicted in FIG. 3A. The focus parameter information includes list a plurality of application functions of the document management apparatus 25, such as a document registration function and a search function, for example. As explained above, many other application functions for a document management system may exist, such as a download application function. The focus parameter information further includes candidate focus parameters for each of the plurality of application functions, where the candidate focus parameters are all of the focus parameters that may be used in conjunction with an application function.

Focus parameters are parameters that may be used in conjunction with an application function to limit the execution of the application function in some manner. For instance, focus parameters may be used with a search function for limiting a search to an extent of data less than all document data in a document data, where the search is based on one or more key terms. For example, if a user wishes to search for all documents containing the terms 'boy', 'motorcycle', 'cat' and 'snow', then these four words would be key terms of a search. Moreover, if the user wished to limit the search only to an extent of data that includes documents with an author X and a creation data of Y, then the author and creation date are focus parameters that may limit the search, while the terms X and Y are referred to herein as focus parameter values, parameter values or focus terms.

Thus, in the example of FIG. 3A, the candidate focus parameters for the document registration function include directory, author, format, account #, case #, client #, docket #, invoice #, patient # and vendor #. The candidate focus parameters for the search function include the above-mentioned focus parameters for the document registration function as well as size, creation date and modification date.

Returning now to FIG. 2, the document access apparatus 27 is configured to communicate through the network 11 with the document management apparatus 25. Document access apparatus 27 includes a user authentication part 27a, an application interface part 27b, and an operations user interface part 27c.

The user authentication part 27a is configured to maintain, for each particular one of a plurality of users, user access information corresponding to the particular user.

FIG. 4A depicts an example of user access information. In particular, the user access information identifies, by username, a plurality of registered users of the document management apparatus 25. The user access information may include business relevancy information indicating a specific business relevancy filed pertinent to the specific user. For instance, the business relevancy information indicates that a "Legal" business relevancy field is pertinent for username John.Smith, a "Medical" business relevancy field is pertinent for the username Jane.Doe, and so on. The business relevancy information may be set by a systems administrator or a manager, for example. The user access information also includes data access information and business relevancy information, which will be described later. It should be apparent that the user access information is not limited to that shown in FIG. 4A, which merely presents an example.

In addition to maintaining, for each particular one of a plurality of users, user access information corresponding to the particular user, the user authentication part 27a of the document access apparatus 27 is also configured to retrieve the user access information maintained for an application user, upon login by the application user.

An example of a login user interface provided by the document access apparatus 27 to an application user is depicted in FIG. 5A, and includes fields for a user to enter user information that may be used to login the user and authenticate the user. The user information may include a username and user authentication data, such as a password. However, the user information may instead (or in addition) include any information that may be used to login, identify or authenticate a user of a user terminal that may be in communication with a document management apparatus. For example, the user information can include a plurality of names, passwords, screen names, email addresses, telephone numbers, facsimile numbers, etc. The user information may include biometric information (such as fingerprints, palm prints, voice or speech, retinas or irises, facial expressions or features, signature, etc).

After the user authentication part 27a utilizes the user information of the specific user to authenticate the specific user, the user authentication part 27a also utilizes the user information of the specific user to retrieve the user access information maintained for the specific user. For example, the user authentication part 27a may utilize a username of a specific user provided during login of the specific user (via the login user interface, for example, as depicted in FIG. 5A), to retrieve the user access information, as depicted in FIG. 4A.

The application interface part 27b of the document access apparatus 27 is configured to communicate through the network with the application program interface 25a of the document management apparatus 25, to obtain the focus parameter information indicating the candidate focus parameters for the application functions of the document management apparatus 25. An example of focus parameter information is depicted in FIG. 3A, as described above.

The operations user interface part 27c of the document access apparatus 27 is configured to provide an operations user interface to a user of the document access apparatus 27.

In order to receive user selection of an application function of the document management apparatus 25 (after the login of the user), the operations user interface provided by the operations user interface part 27c includes a function selection user interface. An example of a function selection user interface is depicted in FIG. 5b, and the function selection user interface is provided to accept a user selection of an application function, such as a user selection of a search function as seen in FIG. 5B.

The operations user interface part 27c is further configured to determine user-specific focus parameters, which are focus parameters for a specific user when utilizing a particular application function (such as a search function) of a document management apparatus. In an embodiment of this disclosure, the operations user interface part 27c determines the user-specific focus parameters based on (a) the user access information for a particular user that has logged into the document access apparatus 27, and (b) the focus parameter information for an application function selected by the specific user. In particular, the determination may be made based on various aspects of the user access information, such as the business relevancy information.

For example, if the user John.Smith has logged in (via login user interface in FIG. 5A, for example), then the operations user interface part 27c may refer to the user access information for the username John.Smith. The operations user interface part 27c may determine that the business relevancy information for John.Smith indicates a 'Legal' business relevancy field, as depicted in FIG. 4A.

If the user John.Smith then selects a search application function of the document management apparatus 25 (via the function selection user interface in FIG. 5B, for example), then the operations user interface part 27c may refer to the focus parameter information for the search application function, as depicted in FIG. 3A. The focus parameter information may be obtained from the document management apparatus 25. The focus parameter information for the search function indicates a number of candidate focus parameters, such as directory, author, size, format, and so forth.

Based on this business relevancy information and focus parameter information, the operations user interface part 27c is able to determine user-specific focus parameters. That is, since the username John.Smith has a 'Legal' business relevancy field, the operations user interface part 27c may determine that the user-specific focus parameters for the search function are directory, author, size, format, creation date, modification data, case #, client # and docket #. On the other hand, if the user had an 'Accounting' relevancy field, then the operations user interface part 27c may determine that the user-specific focus parameters for the search function are directory, author, size, format, creation date, modification date, account #, invoice # and vendor #. If necessary, the focus parameter information may include further information indicating the business relevancy field to which each candidate focus parameter corresponds to, as depicted in FIG. 4A.

Thus, the operations user interface part 27c determines user-specific focus parameters, which are focus parameters for a specific user when utilizing a particular application function of a document management apparatus. Since the focus parameter information is stored and maintained locally at the document management apparatus 25 side, the focus parameter information may be updated to reflect changes and features of the document management apparatus 25, such as new application functions. These changes may be made without having to amend any information regarding the access rights of all the users of the document management apparatus 25, since the user access information is stored and maintained locally at the document access apparatus 2 side. Thus, the application functions of a given document management apparatus (such as document management apparatus 25) may be enjoyed be a first discrete set of users via a first document access apparatus and a second different set of users via a second document access apparatus. Similarly, a given set of users registered with a document access apparatus (such as document access apparatus 27) may enjoy the different application functions of different document management apparatuses.

Returning to FIG. 2, the operations user interface part 27c is configured to provide an operations user interface through the network 11 to a user terminal (such as one of the plurality of terminals 12-1 through 12-4) or a multi-function device. The operations user interface is configured to show the user-specific focus parameters, described above, and allows the user to select one or more of the user-specific focus parameters, and also specify parameter values for the selected focus parameters.

The operations user interface may take one of several forms, depending on an application functionality selected by the user. For example, if the selected application function is a search function, then the operations user interface includes a search interface configured for the application user to specify one or more key terms, as well as select focus parameters (from the user-specific focus parameters) and parameter values for the selected focus parameters.

An example of a search interface provided by the operations user interface part 27c is depicted in FIG. 5C. It may be seen that the user is searching for documents and document data of the document management apparatus 25 that includes all of the words 'boy', 'motorcycle', 'cat', and 'snow'. Thus, the key terms in this case are 'boy', 'motorcycle', 'cat' and 'snow'.

In the example of FIG. 5C, the selected user-specific focus parameters include 'Directory', 'Author', 'Size' and 'Format', and the corresponding parameter values for the selected user-specific focus parameters are 'G://XYZ/', 'Jim.Alpha', '100 KB' and 'Microsoft Word' respectively. It may be seen that the search interface allows the user to select from user-specific focus parameters such as 'Directory', 'Author', 'Size' and 'Format' using pull-down option menus. The user can edit the parameter values via pull down menus, as shown in FIG. 5C, of via text keyboard entry.

The application interface part 27b of the document access apparatus 27 communicates the key terms and any focus terms for selected focus parameters (i.e. selected user-specific focus parameters along with the corresponding parameter values) to the document management application for the search. According to this embodiment, after the application interface part 27b communicates this information, the application interface part 27b does not communicate with the operations user interface part 27c again until a set of search results has been received from the document management apparatus 25 and fully compiled. The application interface part 27b communicates the search results to the operations user interface part 27c only after the search results have been received and compiled. At this point, the operations user interface part 27c may present the search results to the user.

Thus, according to this exemplary embodiment of the present invention, there is provided the tools for the efficient exchange and management of documents and files, and for streamlining access in a document management system. Whereas conventional techniques typically do not communicate search request to the user only after all the search results have been received and complied, the document access apparatus of this disclosure communicates search results to a user only after the entire set of search results has been received and compiled.

The document access apparatus 27 may be embodied as a server that is distinct from the document management apparatus 25. In this way, the document access apparatus 27 may correspond to a first server, and the document management apparatus 25 may correspond to a second server separate and physically distinct from the first server. Hence, while conventional document management systems typically have an integrated user interface, such that any modification of the user interface would require taking the document management system offline, the document access apparatus 27 of this disclosure is configured for modification without taking the document management apparatus 25 offline.

While the focus parameter information is generally maintained by the document management apparatus 25, the focus parameter information may also be maintained by the document access apparatus 27 itself. Similarly, while the user access information is generally maintained by the document access apparatus 27, the user access information may also be maintained by the document management apparatus 25.

According to an aspect of this disclosure, the operations user interface part 27c determines not only the user-specific focus parameters, but also the extent of the parameter values that may be selected by the user in relation to a user-specific focus parameter. For example, if the user-specific focus parameter is 'Directory' (location), the operations user interface part 27c may determine the available parameter values for this focus parameter, based on the user access information.

With reference to FIGS. 6A and 6B, there is shown an example of a search interface having the above-mentioned aspects of this disclosure. In particular, the search interface includes user-specific focus parameters for a search function for a user having a 'legal' business relevancy field. As is clear in FIG. 6A, one of the user-specific focus parameters is the 'Directory' focus parameter, and the operations user interface part 27c has determined and provided the appropriate parameter values, based on the 'legal' business relevancy field of the user. The information of the particular directories may be obtained from the document management apparatus 25. FIG. 6B depicts how the other user-specific parameter values have also been determined based on the 'legal' business relevancy field of the user (i.e. the user-specific focus parameters include client #, docket # and case #).

In FIGS. 7A and 7B, there is shown another example of a search interface, this time including user-specific focus parameters for a search function for a user having an 'accounting' business relevancy field. As is clear in FIG. 7A, one of the user-specific focus parameters is the 'Directory' focus parameter, and the operations user interface part 27c has determined and provided the appropriate parameter values, based on the 'accounting' business relevancy field of the user. The information of the particular directories may be obtained from the document management apparatus 25. FIG. 7B depicts how the other user-specific parameter values have also been determined based on the 'accounting' business relevancy field of the user (i.e. the user-specific focus parameters may include account #, invoice # and vendor #).

While the determination of the user-specific focus parameters has been described as taking place at the document access apparatus 27 side, the determination of the user-specific focus parameters may also take place at the document management apparatus 25 side, as long as the document management apparatus 25 is able to obtain the user access information.

According to another aspect of this disclosure, the user-specific focus parameters are determined only on the basis of the focus parameter information; for example, all the candidate focus parameters are treated as the user-specific focus parameters.

According to another aspect of this disclosure, the user-specific focus parameters are determined only on the basis of the user access information. For example, the user access information may include document parameters information, as seen in FIG. 4A, which identifies predetermined focus parameters that will constitute the user-specific focus parameters for all application functions. Such document parameters information may be set by a systems administrator, for example.

According to another aspect of this disclosure, the user access information may include data access information indicating an extent of data accessible by the user, and this information may be used by the operations user interface part 27c to determine parameter values for the user-selected focus parameters. With reference to the user access information for FIG. 4A, for example, it can be seen that the user John.Smith is only permitted to access document databases A, B and C. Thus, the parameter values for a 'Directory' user specific focus parameter (as seen in FIG. 5C, for example) may be controlled to only include databases corresponding to A, B and C. The data access information may be included in the user access information, as described above, or may be stored separately as access control information including an access control list, as depicted in FIG. 9B.

Figure 8A:
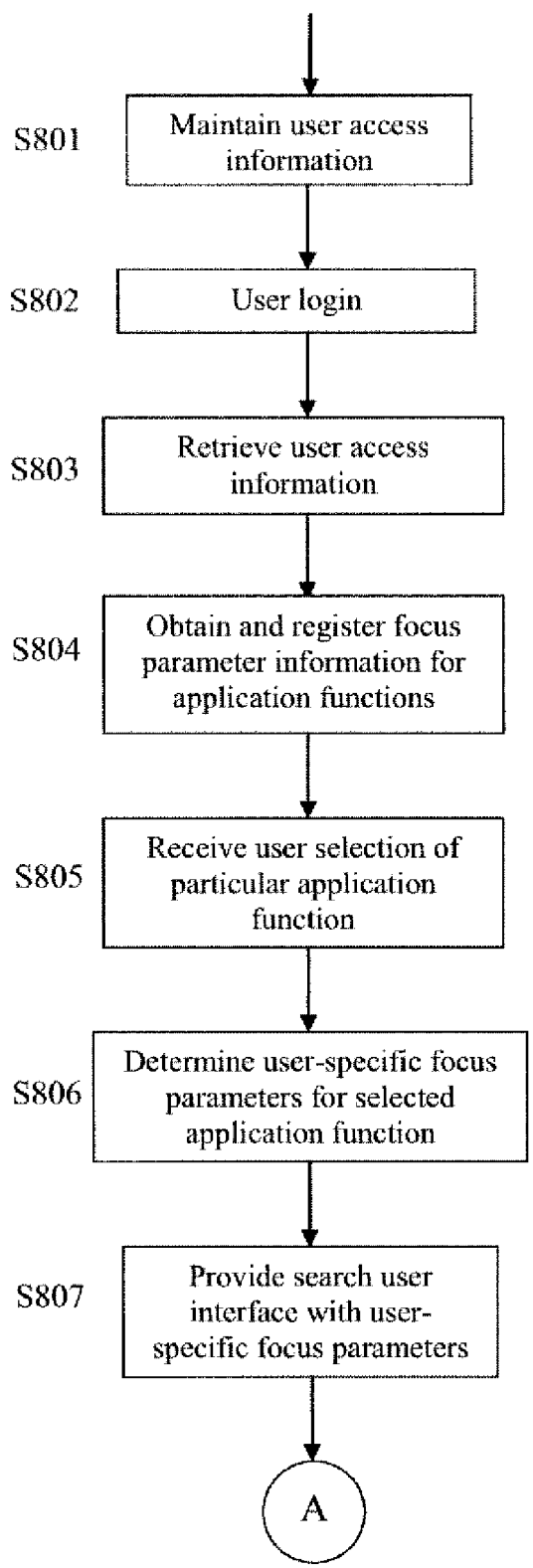
FIG. 8 shows an example of a workflow on a document access apparatus (or application user interface apparatus) side.
Figure 8B:
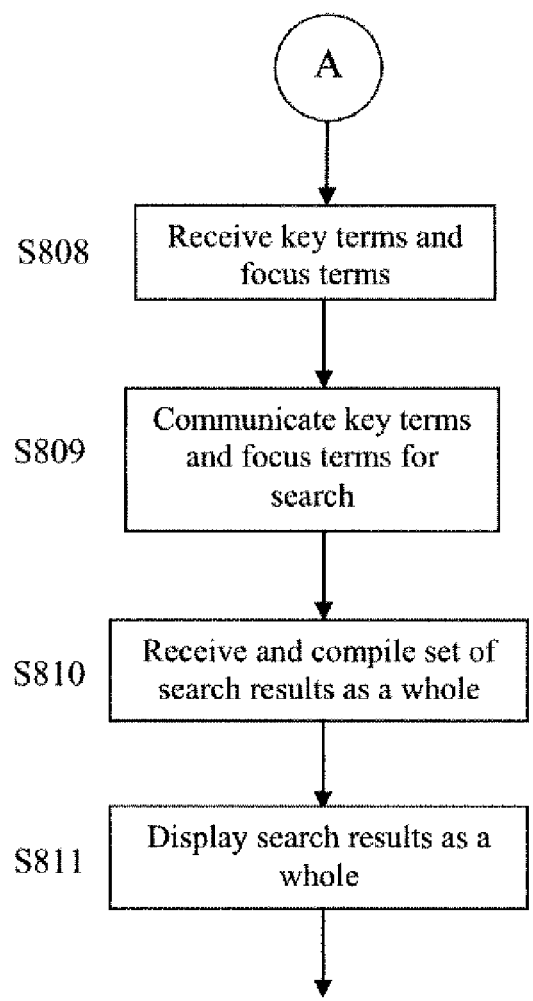

Turning now to FIG. 8, there is shown an example of a workflow on a document access apparatus side, such as the document access apparatus 27 in FIG. 2.

Firstly, in S801, user access information is maintained by the document access apparatus for each particular one of a plurality of specific users. An example of user access information is depicted in FIG. 4A.

In S802, a user logs into the document access apparatus. The document access apparatus may provide a login user interface, such as depicted in FIG. 5A, to the user for the user to login and transmit user information to the document access apparatus. In S803, user access information is retrieved for the user that logged into the document access apparatus in S802.

In S804, the document access apparatus obtains and registers focus parameter information indicating the candidate focus parameters for all the application functions of a document management apparatus. The focus parameter information may be obtained from the document management apparatus. An example of focus parameter information depicted in FIGS. 3A and 3B).

Thereafter, in S805 the document access apparatus receives user selection of a particular application function of the document management apparatus. The document access apparatus may provide a function selection user interface to the user, such as the one depicted in FIG. 5B, for the user to select an application function. In S806, the document access apparatus then determines user-specific focus parameters for the logged-in user, for the application function selected in S805.

Thereafter, in S807 the document access apparatus provides an operations user interface to the user to show the user-specific focus parameters determined in S806, and to allow the user to select one or more of the user-specific focus parameters of the selected application function and specify parameter values for the selected focus parameters. More specifically, if the application function selected in S805 is a search function, the document access apparatus may provide a search user interface for the user to specify key terms, and focus terms for selected focus parameters (i.e. user-specific focus parameters and corresponding parameter values). These key terms and focus terms are received at the document access apparatus in S808.

In S809, the document access apparatus communicates the key terms and focus terms to the document management apparatus in order to perform a search based on the key terms and focus terms. Then in S810 the document access apparatus receives and compiles the set of search results as a whole. Finally in S811, the search results are communicated and displayed by an operations user interface part to a user. Thus, the search results are displayed (S811) only after the set of search results have been received and compiled as a whole (S810).

Figure 9:
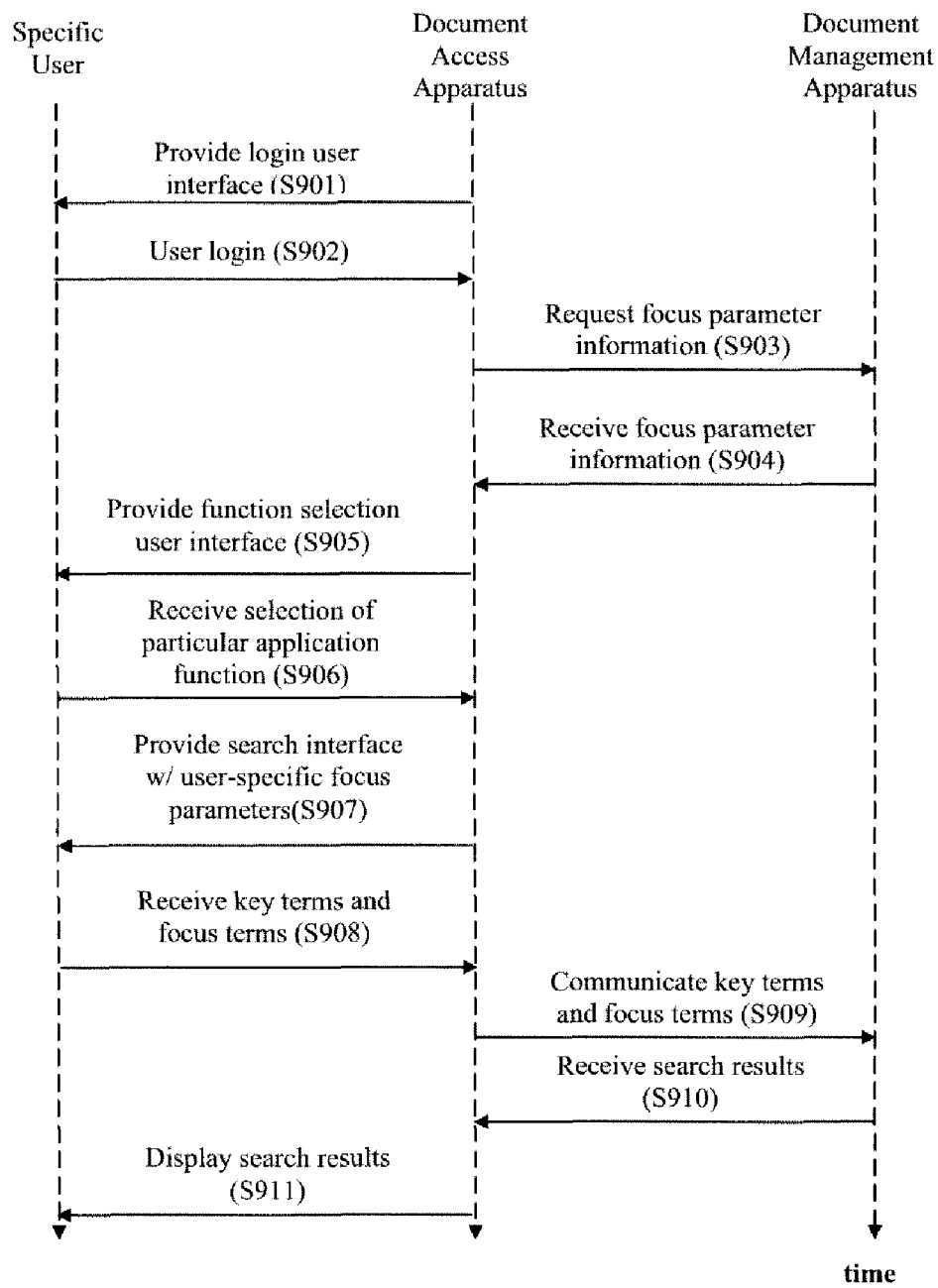
FIG. 9 shows a schematic view of an example of a data flow in an exemplary embodiment.

Turning now to FIG. 9, a schematic view of an example of a data flow in an exemplary embodiment, such as the embodiment described in the workflow of FIG. 8, is presented.

Firstly, in S901, the document access apparatus may provide a login user interface, such as depicted in FIG. 5A, to the user for the user to login and transmit user information to the document access apparatus.

In S902, a user logs into the document access apparatus. In S903, the document access apparatus transmits a request to the document management apparatus for focus parameter information for the application functions of the document management apparatus.

In S904, the document access apparatus receives and registers focus parameter information indicating the candidate focus parameters for all the application functions of the document management apparatus. An example of focus parameter information is depicted in FIG. 3A (and 3B).

Thereafter, the document access apparatus provides a function selection user interface to the user, such as depicted in FIG. 5B, for the user to select an application function (S905). The document access apparatus receives the user selection of a particular application function in S906.

The document access apparatus then determines user-specific focus parameters for the logged-in user, and in S907 the document access apparatus provides a search user interface for the user to specify key terms, and focus terms for selected focus parameters (i.e. user-specific focus parameters and corresponding parameter values). These key terms and focus terms are received at the document access apparatus in S908.

In S909, the document access apparatus communicates the key terms and focus terms to the document management apparatus in order to perform a search based on the key terms and focus terms. Then in S910 the document access apparatus receives and compiles the as of search results as a whole. Finally in S911, the search results are communicated and displayed by an operations user interface part to a user. Thus, the search results are displayed (S911) only after the set of search results have been received and compiled as a whole (S910).

Figure 10A:
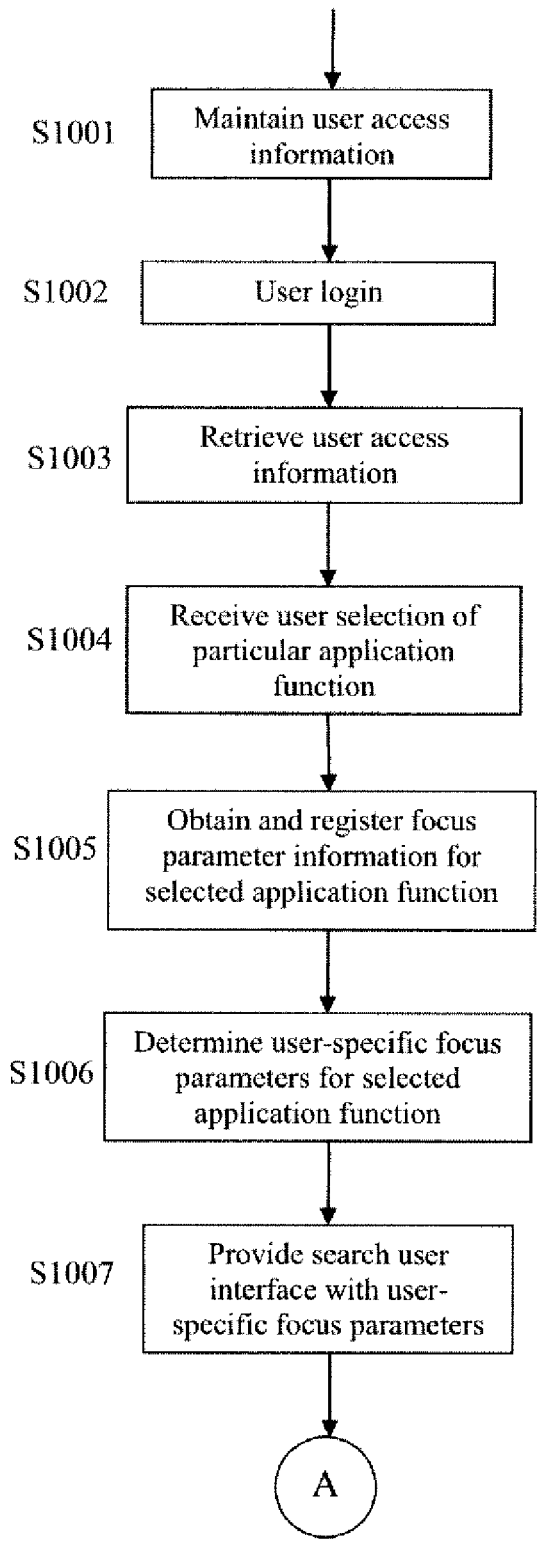
FIG. 10 shows an example of a workflow on a document access apparatus (or application user interface apparatus) side, in another exemplary embodiment.
Figure 10B:
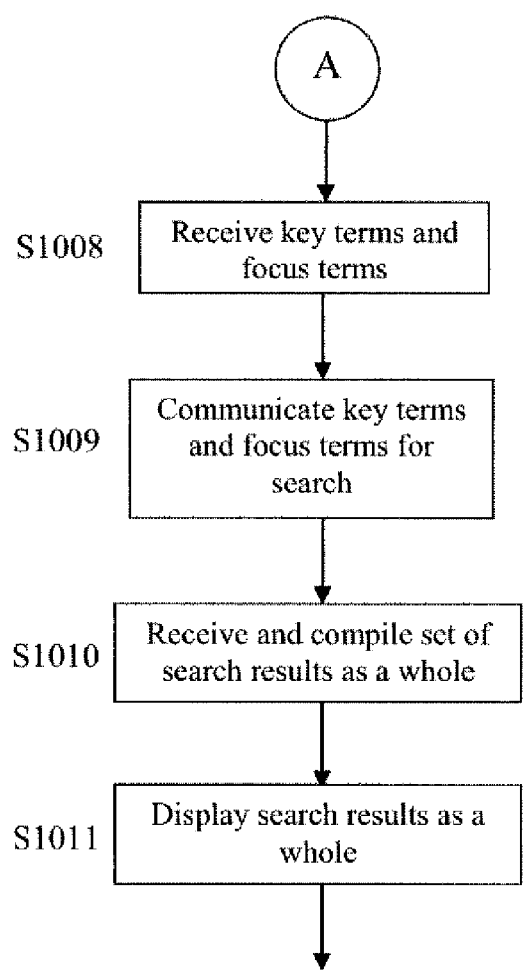

Turning now to FIG. 10, there is shown another example of a workflow on a document access apparatus side, such as the document access apparatus 27 in FIG. 2.

S1001 through S1003 are substantially similar to S801 through S803 depicted in FIG. 8.

In S1004 the document access apparatus receives user selection of a particular application function of the document management apparatus. The document access apparatus may provide a function selection user interface to the user, such as the one depicted in FIG. 5B, for the user to select an application function.

In S1005, the document access apparatus obtains and registers focus parameter information indicating the candidate focus parameters for the selected application function of the document management apparatus. That is, only the focus parameter information for the application function selected in S1004 is registered. The focus parameter information may be obtained from the document management apparatus. An example of focus parameter information is depicted in FIG. 3A (and 3B).

Thereafter, S1006 through S1011 are substantially similar to S806 through S811 of FIG. 8.

Figure 11:
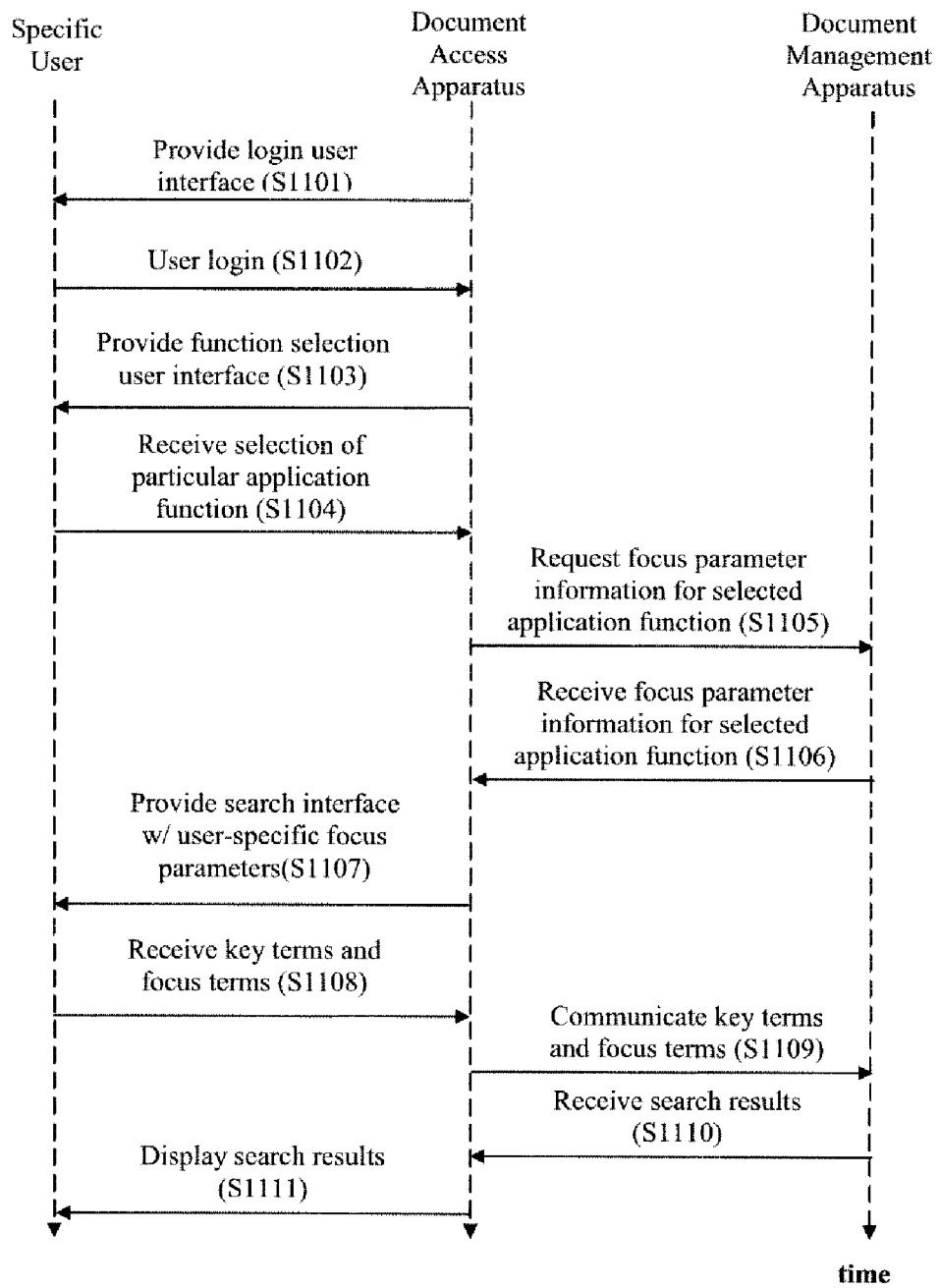
FIG. 11 shows a schematic view of an example of a data flow in another exemplary embodiment.

Turning now to FIG. 11, a schematic view of an example of a data flow in an exemplary embodiment, such as the embodiment described in the workflow of FIG. 10, is presented.

Firstly, in S1101, the document access apparatus may provide a login user interface, such as depicted in FIG. 5A, to the user for the user to login and transmit user information to the document access apparatus. In S1102, the user logs into the document access apparatus.

Thereafter, the document access apparatus provides a function selection user interface to the user, such as depicted in FIG. 5B, for the user to select an application function (S1103). The document access apparatus receives the user selection of a particular application function in S1104.

In S1105, the document access apparatus transmits a request to the document management apparatus for focus parameter information for the selected application function of the document management apparatus. That is, only the focus parameter information for the application function selected in S1104 is requested.

In S1106, the document access apparatus receives and registers the focus parameter information indicating the candidate focus parameters for the selected application function. An example of focus parameter information is depicted in FIG. 3A (and 3B).

Thereafter, S1107 through S1111 are substantially similar to S907 through S911 of FIG. 9.

Figure 12A:
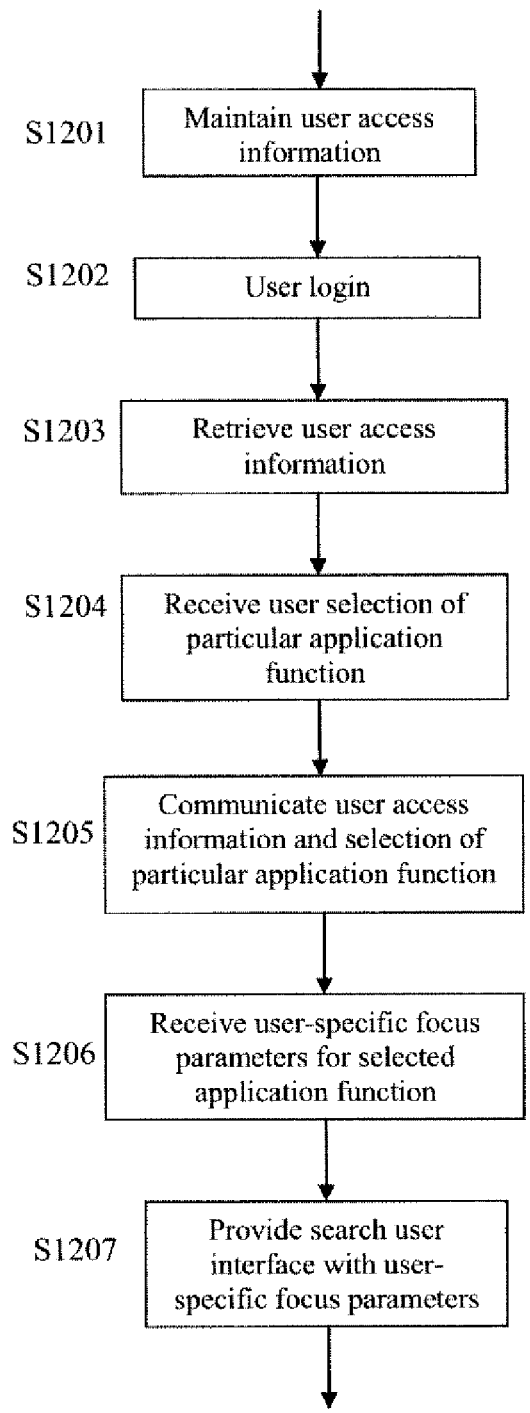
FIG. 12 shows an example of a workflow on a document access apparatus (or application user interface apparatus) side, in another exemplary embodiment.
Figure 12B:
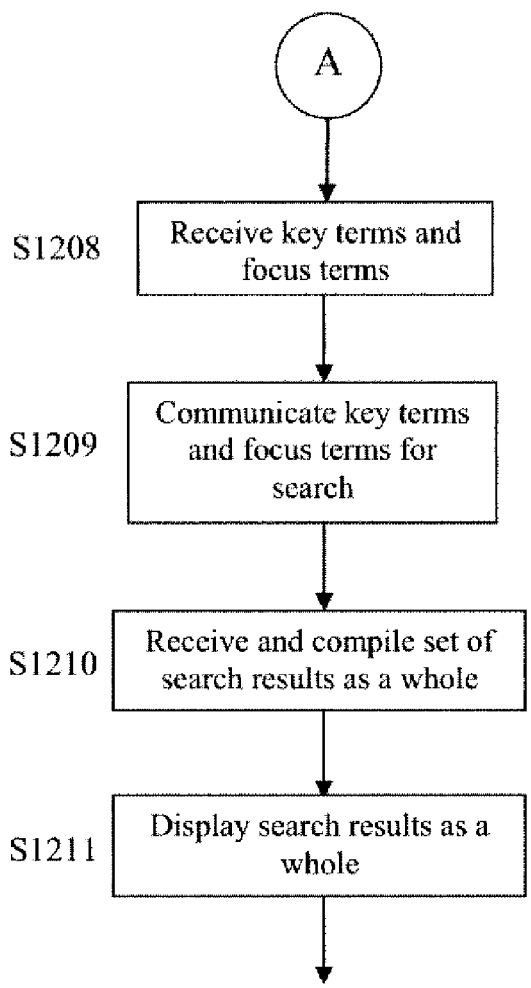

Turning now to FIG. 12, there is shown another example of a workflow on a document access apparatus side, such as the document access apparatus 27 in FIG. 2.

S1201 through S1203 are substantially similar to S801 through S803 depicted in FIG. 8.

In S1204 the document access apparatus receives user selection of a particular application function of the document management apparatus. The document access apparatus may provide a function selection user interface to the user, such as the one depicted in FIG. 5B, for the user to select an application function.

In S1205, the document access apparatus communicates user access information, and the selection of the application function received in S1204, to a document management apparatus.

In S1206, the document access apparatus receives user-specific focus parameters for the selected application function, from the document management apparatus. That is, the user-specific focus parameters for the selected application function are calculated at the document management apparatus side.

Thereafter, S1207 through S1211 are substantially similar to S807 through S811 of FIG. 8.

Figure 13:
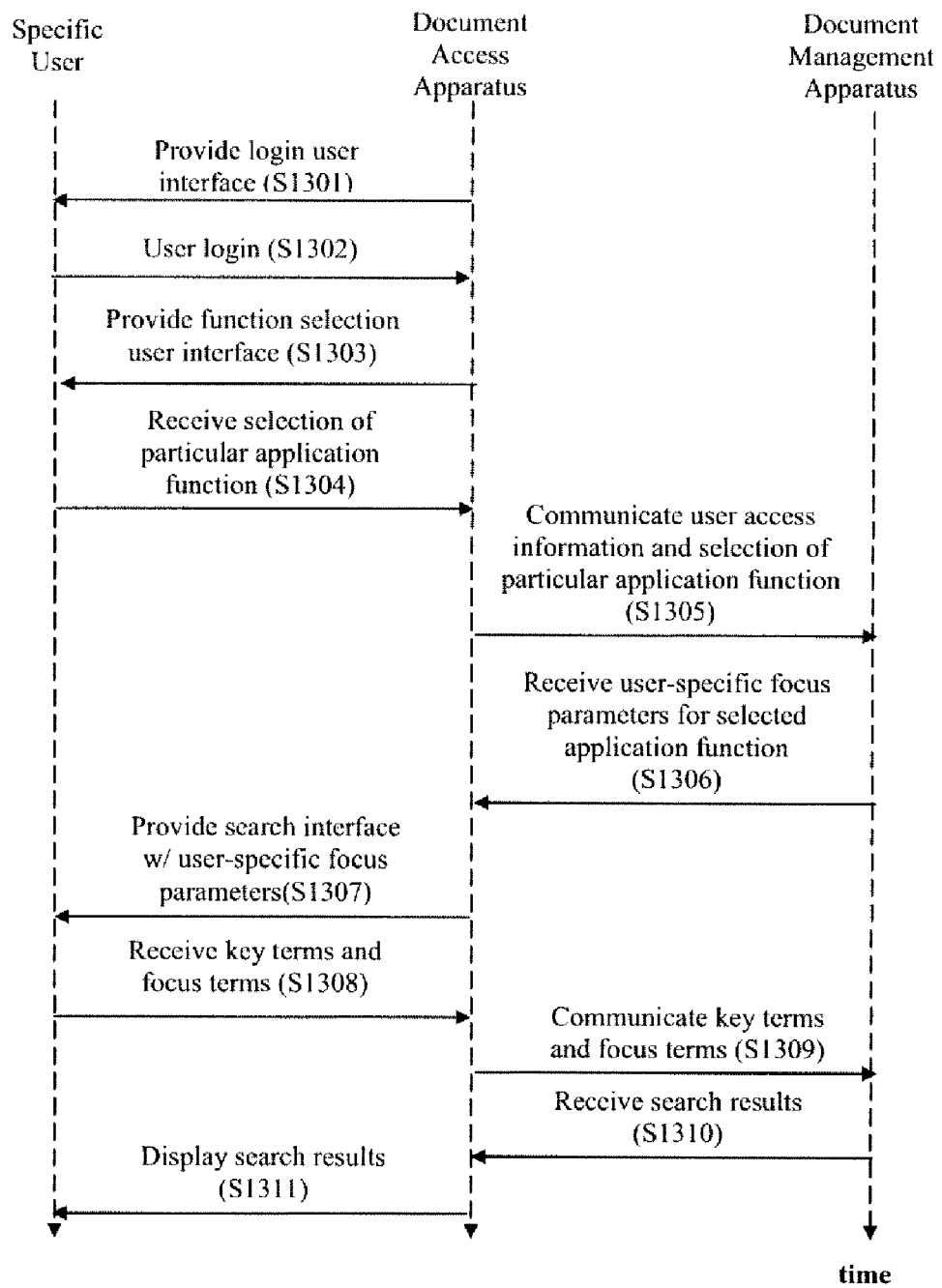
FIG. 13 shows a schematic view of an example of a data flow in another exemplary embodiment.

Turning now to FIG. 13, a schematic view of an example of a data flow in an exemplary embodiment, such as the embodiment described in the workflow of FIG. 12, is presented.

Firstly, in S1301, the document access apparatus may provide a login user interface, such as depicted in FIG. 5A, to the user for the user to login and transmit user information to the document access apparatus. In S1302, the user logs into the document access apparatus.

Thereafter, the document access apparatus provides a function selection user interface to the user, such as depicted in FIG. 5B, for the user to select an application function (S1303). The document access apparatus receives the user selection of a particular application function in S1304.

In S1305, the document access apparatus communicates user access information, and the selection of the application function received in S1304, to the document management apparatus.

In S1306, the document access apparatus receives user-specific focus parameters for the selected application function, from the document management apparatus. That is, the user-specific focus parameters for the selected application function are calculated at the document management apparatus side.

Thereafter, S1307 through S1311 are substantially similar to S907 through S911 of FIG. 9.

Figure 14:
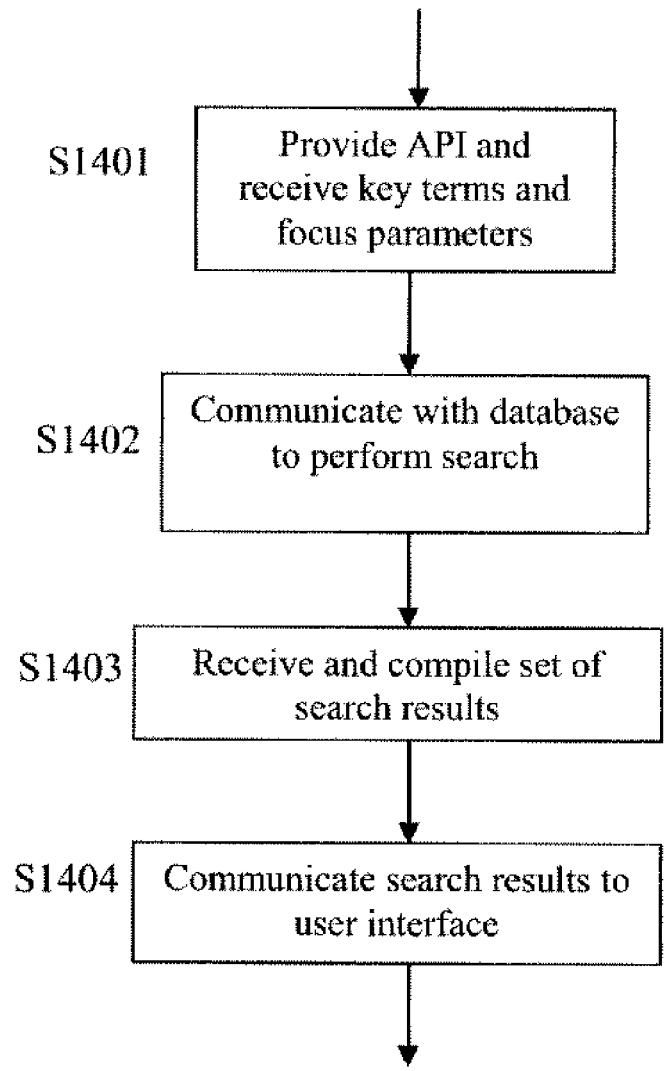
FIG. 14 shows an example of a workflow on a document management apparatus side, in another exemplary embodiment.

Turning now to FIG. 14, there is shown an example of a workflow on a document management apparatus side, such as document management apparatus 25 in FIG. 2.

In S1401, the document management apparatus provides a single application programming interface (API) that is configured to receive, from any of a plurality of different user interface apparatuses corresponding to respective business relevancy fields, one or more key terms for a search and focus parameters (e.g. user-specific focus parameters and corresponding parameter values) for limiting a search to an extent of data less than all document data in the document management apparatus.

In S1402, the API of the document management apparatus communicates the key terms and focus parameters to a document database to perform a search based on the key terms and focus parameters. This is down without communicating with a user interface from which the key terms and the focus parameters for the search were received.

In S1403, the document management apparatus receives and compiles a set of search results. Finally, in S1404, the search results are communicated from the API of the document management apparatus to the user interface, for presentation on the user interface for a user.

While the example shown in FIG. 2 includes one document management apparatus, one document access apparatus and four client terminals 12-1 through 12-4, it should be appreciated that such numbers of systems, servers, apparatuses and terminals are arbitrary and are selected as an example in order to facilitate discussion, and that the subject matter of this disclosure can be implemented in a system including one or more systems, servers, apparatuses and terminals. Further, it is noted that a document access apparatus and terminal can be included in one integrated device (or of course can be separate devices). Other devices, such as scanners, printers and multi-function devices (MFDs) may also be connected to the network 11, as is well known in the art.

Each of the client terminals 12-1 through 12-4 can be any computing device, including but not limited to a personal, notebook or workstation computer, a kiosk, a PDA (personal digital assistant), a MFD (multi-function device), a server, a mobile phone or handset, another information terminal, etc., that can communicate through the network 11 with other devices.

While four client terminals 12-1 through 12-4 are depicted in FIG. 2, it should be understood that system 200 can include any number of client terminals (which can have similar or different configurations) connected to the network 11.

The document access apparatus 27 can be configured in software or hosted on any computing device, including but not limited to a personal, notebook or workstation computer, a kiosk, a PDA (personal digital assistant), a MFD, a server, a mobile phone or handset, another information terminal, etc., that can communicate through the network 11 with other devices.

The document access apparatus 27 of this disclosure may be realized by a computer program product including a computer-usable, non-transient medium (such as a disk storage apparatus) having instructions tangibly embodied therein that are executed by a computer.

Thus, it should be understood that document access apparatus 27 may be executed on a computer. While document access apparatus 27 is shown as being external to the client terminals 12-1 through 12-4, the document access apparatus 27 may in fact be executed on one of the client terminals 12-1 through 12-4.

The document management apparatus 25 may include a data store that can comprise one or more structural or functional parts that have or support a storage function. For example, the data store can be, or can be a component of, a source of electronic data, such as a document access apparatus, a backend server connected to a document access apparatus, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

The network 11 can include one or more of a secure intranet or extranet local area network, a wide area network, any type of network that allows secure access, etc., or a combination thereof. Further, other secure communications links (such as a virtual private network, a wireless link, etc.) may be used as well in the network 11. In addition, the network 1 preferably uses TCP/IP (Transmission Control Protocol/Internet Protocol), but other protocols can also be used. How devices can connect to and communicate over the network 11 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 15:
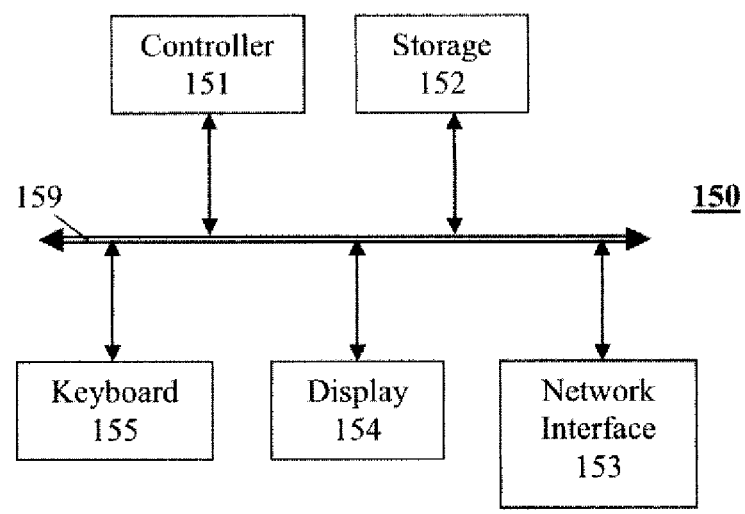
FIG. 15 shows a block diagram of an exemplary configuration of a document management apparatus (or application user interface apparatus)

FIG. 15 shows an exemplary constitution of a document access apparatus 150 as a computer, for example, that can be configured through software to provide the document access apparatus 27 of FIG. 2. As shown in FIG. 15, the document access apparatus 150 includes a controller (or central processing unit) 151 that communicates with a number of other components, including memory or storage part 152, network interface 153, display 154 and keyboard 155, by way of a system bus 159.

The document access apparatus 150 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In document access apparatus 150, the controller 151 executes program code instructions that control conferencing apparatus operations. The controller 151, memory/storage 152, network interface 153, display 154 and keyboard 155 are conventional, and therefore in order to avoid occluding the inventive aspects of this disclosure, such conventional aspects will not be discussed in detail herein.

The document access apparatus 150 includes the network interface 153 for communications through a network, such as communications through the network 11 with the client terminals 12-1 through 12-4 and document management apparatus 25 in FIG. 2. However, it should be appreciated that the subject matter of this disclosure is not limited to such configuration. For example, the document access apparatus may communicate with the client terminals 12-1 through 12-4 and document management apparatus 25 through direct connections and/or through a network to which some components are not connected. As another example, the document access apparatus need not be provided by a server that services terminals, but rather may communicate with the terminals on a peer basis, or in another fashion.

As mentioned above, document access apparatus 27 is not limited to a server or computer, but can be manifested in any of various devices that can be configured to communicate over a network and/or the Internet.

Note that one or more of the user interfaces (such as the registration user interface or the operations user interface) may be provided as web services through the network to the client terminal.

Figure 16:
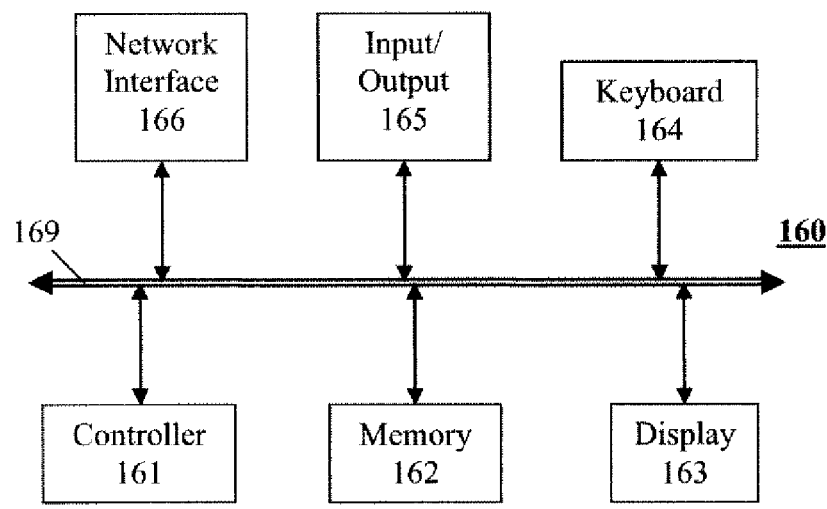
FIG. 16 shows a block diagram of an exemplary configuration of a client terminal.

An example of a configuration of one of the plurality of client terminals 12-1 through 12-4 (for example, as a computer) is shown schematically in FIG. 16. In FIG. 16, computer 160 includes a controller (or central processing unit) 161 that communicates with a number of other components, including memory 162, display 163, keyboard (and/or keypad) 164, other input/output (such as mouse, touchpad, stylus, microphone and/or speaker with voice/speech interface and/or recognition software, etc.) 165, and network interface 166, by way of internal bus 169.

The memory 162 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 166 provides a connection (for example, by way of an Ethernet connection or other network connection which supports any desired network protocol such as, but not limited to TCP/IP, IPX, IPX/SPX, or NetBEUI) to network 11.

A user interface is provided and is configured through software natively or received through a network connection, to allow the user to access electronic data or content on the client terminal and/or via the network, interact with network-connected devices and services (such as the document management apparatus 25), enjoy other software-driven functionalities, etc. For example, a browser (such as Internet Explorer™, Netscape Navigator™, a proprietary browser, etc.) may be provided on the client terminal so that a user of the client terminal can use browsing operations to communicate with the document management apparatus 25, and access other data or content.

Additional aspects or components of the computer 160 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Carpo ration 2000), the entire contents of each of which are incorporated herein by reference.

As mentioned above, each of the client terminals 12-1 through 12-4 is not limited to a personal computer, but can be manifested in a form of any of various devices that can be configured to communicate over a network and/or the Internet.

The above-mentioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A system for providing document management services to a terminal, said system comprising:
   (a) a document management apparatus configured to execute a document management application that includes:
      a plurality of application functions, the plurality of application functions including a document registration function to register specified document in a document database, and a search function to search the document database based on specified terms; and
      an application program interface configured to specify, for each specific one of the plurality of application functions, candidate focus parameters for the specific application function; and
   (b) an application user interface apparatus configured to communicate through a network with the document management application, the application user interface apparatus including a non-transitory storage medium embodying instructions executable to configure the application user interface apparatus to include:
      a user authentication part configured to maintain, for each particular one of a plurality of users, user access information corresponding to the particular user, and configured to retrieve the user access information maintained for an application user, upon login by the application user;
      an application interface part configured to communicate through the network with the application program interface of the document management application, to obtain focus parameter information indicating the candidate focus parameters for the application functions of the document management application;
      an operations user interface part configured to provide to the application user an operations user interface to show user-specific focus parameters, determined according to the user access information of the application user, for a selected application function, and for the application user to select one or more of the user-specific focus parameters of the selected application function and specify parameters values for the selected focus parameters of the selected application function,
   wherein the user-specific focus parameters, specific to the application user, which are shown by the operations user interface differ from focus parameters corresponding to user access information of at least one other user amongst the plurality of users,
   wherein the operations user interface includes a search interface configured to present to the application user the user-specific focus parameters determined according to the user access information of the application user which includes information indicating the user-specific focus parameters specific to the application user, for user selection of search parameters for limiting a search to be performed by the search function of the document management application, and to receive from the application user one or more key terms and focus terms for the selected search parameters,
   the application interface part communicates the focus terms and one or more key terms to the document management application for the search, without communicating with the operations user interface part, until a set of search results to be returned has been compiled, and
   the application interface part communicates the search results to the operations user interface part only after the search results have been received and compiled.

2. The system of claim 1, wherein the application interface part of the application user interface apparatus obtains the focus parameter information indicating the candidate focus parameters for the application functions of the document management application, from the application program interface of the document management application, upon the login by the application user.

3. The system of claim 2, wherein the application interface part of the application user interface apparatus registers the focus parameter information obtained from the application program interface of the document management application upon the login by the application user in a specific session, and the registered focus parameter information is utilized to determine the user-specific focus parameters of a particular application function, upon selection of the particular application function by the application user in the specific session.

4. The system of claim 2, wherein the application interface part of the application user interface apparatus communicates the user access information to the application program interface of the document management application, upon the login by the application user, and the application program interface of the document management application determines and returns the user-specific focus parameters of a particular application function, based on the user access information of the application user.

5. The system of claim 1, wherein the operations user interface part determines based on the user access information of the application user, the user-specific focus parameters of a particular application function, upon selection of the particular application function by the application user.

6. The system of claim 1, wherein the application interface part of the application user interface apparatus obtains the focus parameter information indicating the candidate focus parameters for a particular application function of the document management application, from the application program interface of the document management application, upon selection of the particular application function by the application user.

7. The system of claim 6, wherein the application interface part of the application user interface apparatus communicates the user access information to the application program interface of the document management application, upon the login by the application user, and the application program interface of the document management application determines and returns the user-specific focus parameters of a particular application function, based on the user access information of the application user.

8. The system of claim 1, wherein the operations user interface part determines based on the user access information of the application user, the user-specific focus parameters of the selected application function, after the application interface part of the application user interface apparatus obtains the focus parameter information indicating the candidate focus parameters for the selected application function of the document management application, from the application program interface of the document management application.

9. The system of claim 1, wherein
the user access information maintained by the user authentication part includes business relevancy information indicating a specific business relevancy field pertinent to the specific user,
the application interface part of the application user interface apparatus communicates the user access information including the business relevancy information to the application program interface of the document management application, upon the login by the application user, and
the application program interface of the document management application determines and returns the user-specific focus parameters of a particular application function, based on the business relevancy information of the application user.

10. The system of claim 1, wherein
the user access information maintained by the user authentication part includes business relevancy information indicating a specific business relevancy field pertinent to the specific user, and
the application interface part of the application user interface apparatus communicates the business relevancy information to the application program interface of the document management application, upon the login by the application user, and
the application program interface of the document management application determines and returns the user-specific focus parameters of a particular application function, based on the business relevancy information of the application user.

11. The system of claim 1, wherein the search interface provides to the application user predetermined parameter values, based on the user access information of the application user, corresponding to at least one of the selected search parameters.

12. A document access apparatus configured to access a document management application, including a plurality of application functions, through a network, the plurality of application functions including a document registration function to register a specified document in a document database, and a search function to search the document database based on specified terms, said document access apparatus comprising a non-transitory storage medium embodying instructions executable to configure the document access apparatus to include:
a user authentication part configured to maintain, for each particular one of a plurality of users, user access information corresponding to the particular user, and configured to retrieve the user access information maintained for an application user, upon login by the application user;
an application interface part configured to communicate through the network with an application program interface of the document management application, to obtain focus parameter information indicating candidate focus parameters for the application functions of the document management application;
an operations user interface part configured to provide to the application user an operations user interface to show user-specific focus parameters, determined according to the user access information of the application user, for a selected application function, and for the application user to select one or more of the user-specific focus parameters of the selected application function and specify parameters values for the selected focus parameters of the selected application function,
wherein the user-specific focus parameters, specific to the application user, which are shown by the operations user interface differ from focus parameters corresponding to user access information of at least one other user amongst the plurality of users,
wherein the operations user interface includes a search interface configured to present to the application user the user-specific focus parameters determined according to the user access information of the application user which includes information indicating the user-specific focus parameters specific to the application user, for user selection of search parameters for limiting a search to be performed by the search function of the document management application, and to receive from the application user one or more key terms and focus terms for the selected search parameters,
the application interface part communicates the focus terms and one or more key terms to the document management application for the search, without communicating with the operations user interface part, until a set of search results to be returned has been compiled, and
the application interface part communicates the search results to the operations user interface part only after the search results have been received and compiled.

13. The document access apparatus of claim 12, wherein the application interface part communicates the user access information of the application user through the network to the application program interface of the document management application, and obtains the user-specific focus parameters for the selected application function, through the network from the application program interface of the document management application.

14. The document access apparatus of claim 12, wherein the operations user interface part determines based on the user access information of the application user, the user-specific focus parameters of a particular application function, upon selection of the particular application function by the application user.

15. The document access apparatus of claim 12, wherein
the user access information maintained by the user authentication part includes business relevancy information indicating a specific business relevancy field pertinent to the specific user, and
the operations user interface part provides, upon selection of a selected application function after login by the application user and based on the business relevancy information of the application user, the candidate focus parameters for the selected application function, for selection by the application user, and provides for a selected focus parameter of the selected application function, parameters values for the selected focus parameter of the selected application function, for selection by the application user.

16. The document access apparatus of claim 12, wherein
the user access information maintained by the user authentication part includes business relevancy information indicating a specific business relevancy field pertinent to the specific user,
the application interface part communicates the user access information including the business relevancy information, through the network to the application program interface of the document management application, upon the login by the application user, and the document access apparatus obtains the user-specific focus parameters for the selected application function, through the network from the application program interface of the document management application.

17. The document access apparatus of claim 12, wherein the user access information maintained by the user authentication part includes business relevancy information indicating a specific business relevancy field pertinent to the specific user, and the operations user interface part determines based on the business relevancy information of the application user, the user-specific focus parameters of a particular application function, upon selection of the particular application function by the application user.

18. The document access apparatus of claim 12, wherein the user access information maintained by the user authentication part includes business relevancy information indicating a specific business relevancy field pertinent to the specific user, and the operations user interface part determines based on the business relevancy information of the application user, the user-specific focus parameters of the selected application function, after the application interface part obtains the focus parameter information indicating the candidate focus parameters for the selected application function of the document management application, through the network from the application program interface of the document management application.

19. A method for streamlining access to a document management application including a plurality of application functions, from a terminal via an application user interface apparatus through a network, the plurality of application functions including a document registration function to register a specified document in a document database, and a search function to search the document database based on specified terms, said method comprising the steps of:

maintaining, by the application user interface apparatus, for each particular one of a plurality of users, user access information corresponding to the particular user, and retrieving the user access information maintained for an application user, upon login by the application user;

communicating, by the application user interface apparatus through the network with an application program interface of the document management application, to obtain focus parameter information indicating candidate focus parameters for the application functions of the document management application;

providing, by the application user interface apparatus, to the application user an operations user interface to show user-specific focus parameters, determined according to the user access information of the application user, for a selected application function, and for the application user to select one or more of the user-specific focus parameters of the selected application function and specify parameters values for the selected focus parameters of the selected application function, wherein the user-specific focus parameters, specific to the application user, which are shown by the operations user interface differ from focus parameters corresponding to user access information of at least one other user amongst the plurality of users; and providing, by the application user interface apparatus, a search interface to present to the application user the user-specific focus parameters determined according to the user access information of the application user which includes information indicating the user-specific focus parameters specific to the application user, for user selection of search parameters for limiting a search to be performed by the search function of the document management application, and to receive from the application user one or more key terms and focus terms for the selected search parameters, communicating the focus terms and one or more key terms to the document management application for the search, without communicating with the operations user interface, until a set of search results to be returned has been compiled, wherein the search results are displayed by the operations user interface part only after the search results have been received and compiled as a whole.

* * * * *